United States Patent
Jyske et al.

(10) Patent No.: US 7,613,112 B2
(45) Date of Patent: Nov. 3, 2009

(54) OPTIMIZING PLAYBACK STARTUP TIME OF BURSTY REAL-TIME STREAMS

(75) Inventors: Eero Jyske, Irving, TX (US); Timo Karras, Espoo (FI)

(73) Assignee: Nokia Corporation, Espoo (FI)

( * ) Notice: Subject to any disclaimer, the term of this patent is extended or adjusted under 35 U.S.C. 154(b) by 650 days.

(21) Appl. No.: 11/167,287

(22) Filed: Jun. 28, 2005

(65) Prior Publication Data

US 2006/0291386 A1 Dec. 28, 2006

(51) Int. Cl.
H04L 5/22 (2006.01)
(52) U.S. Cl. .................. 370/230; 370/233; 370/234; 370/235
(58) Field of Classification Search .................. 370/428, 370/412
See application file for complete search history.

(56) References Cited

U.S. PATENT DOCUMENTS 5,790,521 A 8/1998 Lee

2002/0004840 A1* 1/2002 Harumoto et al. ........... 709/231
2004/0141573 A1 7/2004 Furukawa
2005/0058149 A1 3/2005 Howe
2006/0109856 A1* 5/2006 Deshpande ................. 370/412

FOREIGN PATENT DOCUMENTS

WO 9532570 11/1995
WO 0108366 2/2001

* cited by examiner

Primary Examiner—Lester Kincaid
Assistant Examiner—Dai A Phuong
(74) Attorney, Agent, or Firm—Banner & Witcoff, Ltd.

(57) ABSTRACT

Provided are apparatuses and methods in a digital broadcast transmission system for optimizing the buffering time of data streams prior to data consumption of playback. The optimal buffering time is calculated based on parameters from the server. The parameters may include the burst interval, buffering delay, the average size of data bursts, the amount of data in the buffer, the earliest timestamp and/or the latest timestamp.

12 Claims, 11 Drawing Sheets

OPTIMIZING PLAYBACK STARTUP TIME OF BURSTY REAL-TIME STREAMS

FIELD OF THE INVENTION

The invention relates generally to digital broadcast transmission systems. More specifically, the invention provides for more accurate and efficient buffering of data in broadcast transmission systems.

BACKGROUND OF THE INVENTION

Digital broadband broadcast networks enable end users to receive digital content including video, audio, data, and so forth. Using a mobile terminal, a user may receive digital content over a wireless digital broadcast network. Digital content can be transmitted wirelessly using a fixed data rate, such as provided by the MPEG-TS (Moving Pictures Experts Group Transport Stream) standard. To keep up a level of acceptable quality of service, at least some amount of buffering of data is needed. If an insufficient amount of data is maintained in the buffer during data streaming, the data in the buffer may be completely consumed resulting in unacceptable interruptions in service. Thus, a user may experience frustration from having to wait for the arrival of subsequent data. Conversely, if there is excessive buffering, there is a resultant increase in memory consumption and use of resources. This results in delays in the service provision, for example, more time may be necessary to open the service.

When the bit rate is constant, buffering may be calculated based on the amount of time to allow for buffering and the rate of bit streaming. However, accurate determination of the proper amount of buffering is difficult in most systems, such as systems with bursty traffic.

Methods and systems are needed to enable more efficient transmissions in wireless digital broadcast networks.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

Aspects of the invention provide for calculating an optimal buffering time for permitting receipt of data streams and storage of data in a buffer during the optimal buffering time so that consumption of data (e.g., playback) may be performed without undesired service interruption. For example, data from data streams is stored in a buffer. A period of time is determined such that a receiver waits the determined period of time before the receiver consumes the stored data. The period of time is determined based on parameters from a server. In one example, the parameters include an average data size of a data burst. In another example, the parameters include timestamp information. In yet another example, the parameters include an amount of data in the buffer.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
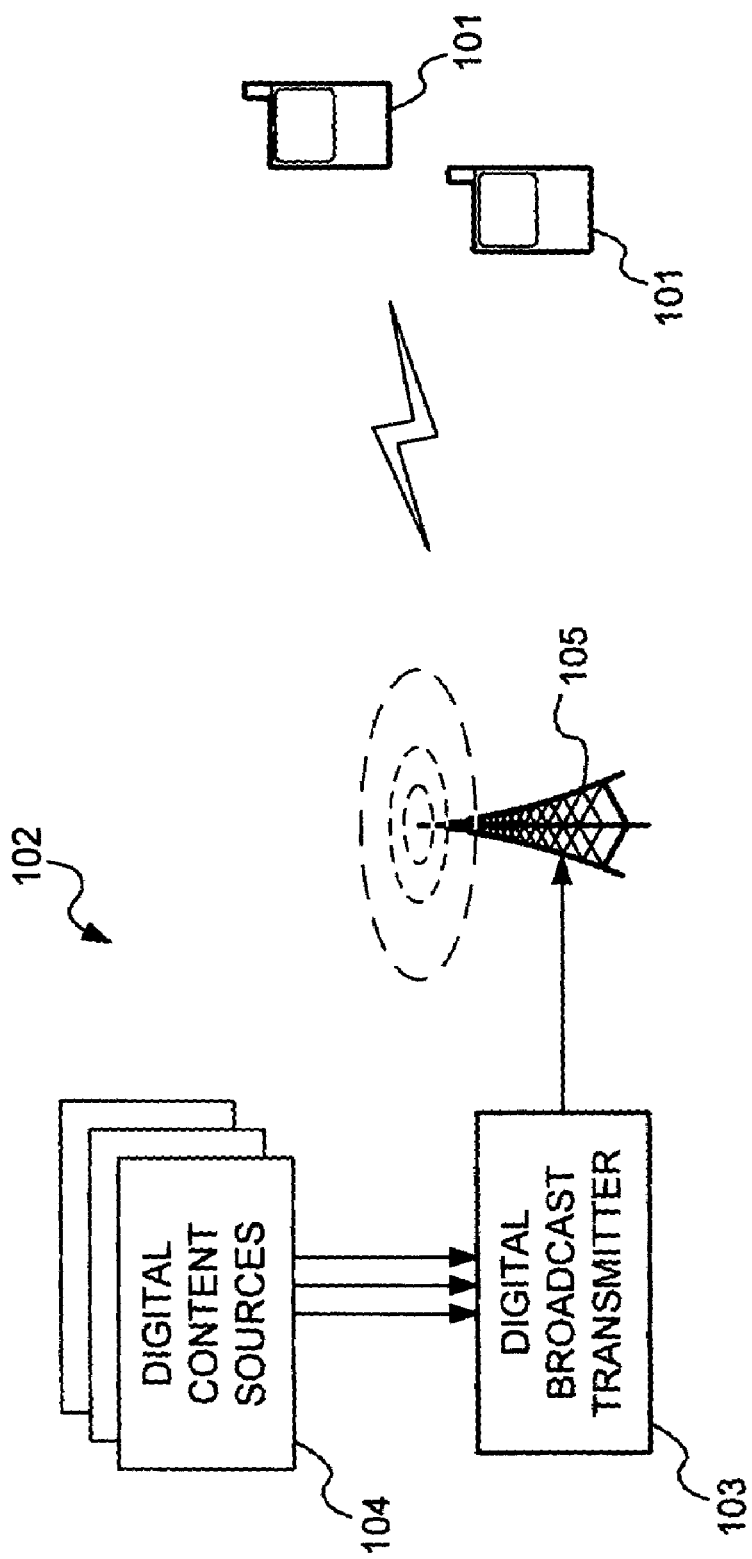
FIG. 1 illustrates a suitable digital broadband broadcast system in which one or more illustrative embodiments of the invention may be implemented.

FIG. 1 illustrates a suitable digital broadband broadcast system 102 in which one or more illustrative embodiments of the invention may be implemented. Systems such as the one illustrated here may utilize a digital broadband broadcast technology, for example Digital Video Broadcast-Handheld (DVB-H). Examples of other digital broadcast standards which digital broadband broadcast system 102 may utilize include Digital Video Broadcast-Terrestrial (DVB-T), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Forward Link Only (FLO), Digital Audio Broadcasting (DAB), and Digital Radio Mondiale (DRM). Other digital broadcasting standards and techniques, now known or later developed, may also be used.

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple IP streams from multiple digital content sources 104. The processed digital content may then be passed to digital broadcast tower 105 (or other physical transmission implements) for wireless transmission. Ultimately, mobile terminals 101 may selectively receive and consume digital content originating with digital content sources 104.

Figure 2:
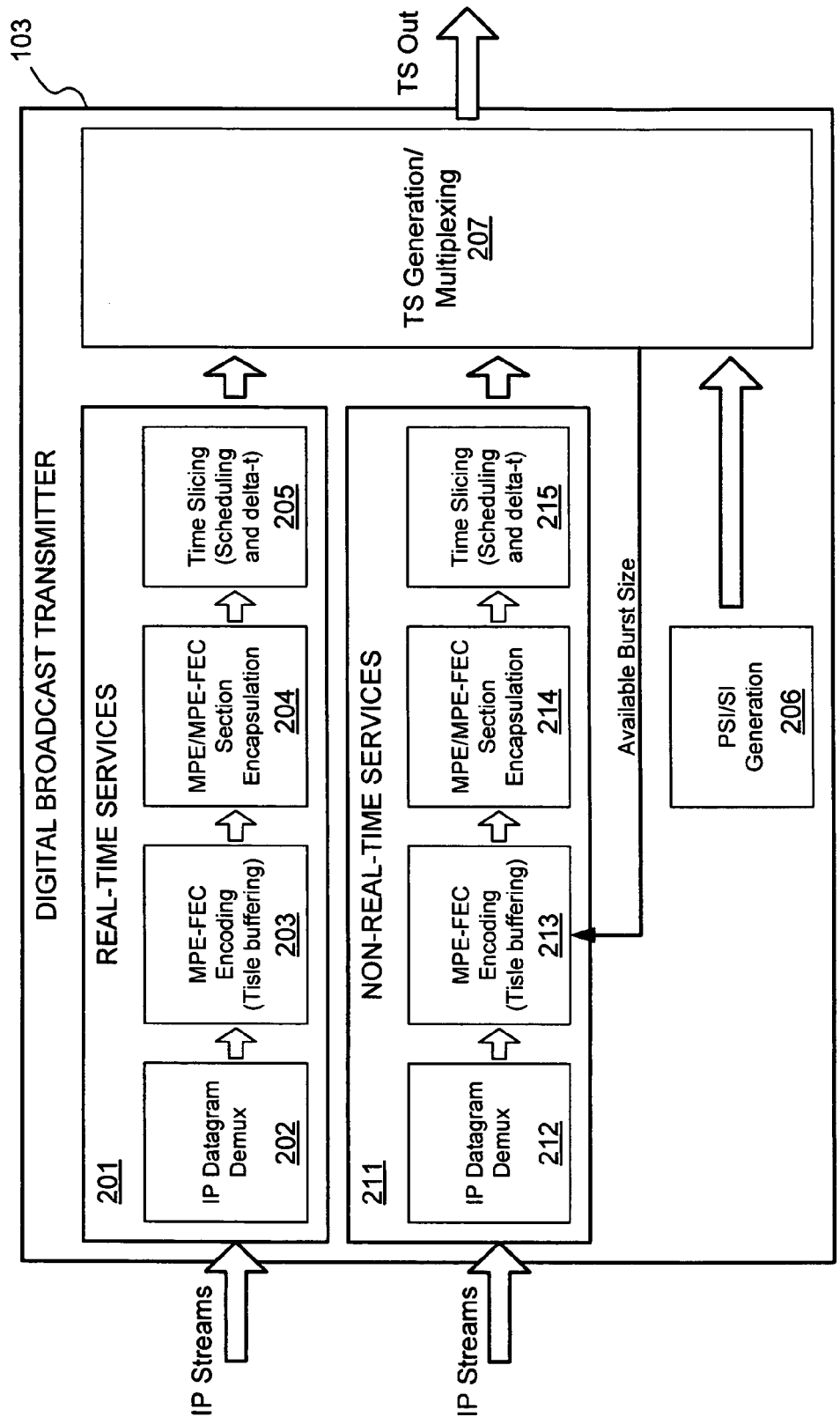
FIG. 2 illustrates a suitable digital broadcast transmitter in which one or more illustrative embodiments of the invention may be implemented.

FIG. 2 illustrates a suitable digital broadcast transmitter 103 in which one or more illustrative embodiments of the invention may be implemented. Such a device may be referred to as an IP encapsulator. The functional blocks depicted in FIG. 2 present merely one possible embodiment of digital broadcast transmitter 103. Other embodiments may separate or rearrange functionality depicted. IP streams delivering content to digital broadcast transmitter 103 include both real-time services and non-real-time services. Real-time services may include content which should be delivered in a time-sensitive fashion. Non-real-time services may include content which is time-insensitive, or at least less time-sensitive. A service represents one or more IP streams carrying related content (e.g., a video stream coupled with its associated audio stream). Real-time services may include video or audio, or any such streams of content which rely on timely and continuous delivery. Non-real-time services may include anything for which timely and continuous delivery is less important, e.g., the downloading of a data file. IP streams for different types of services may be separated into two or more parallel pipelines 201, 211 within transmitter 103 for separate processing. Alternative embodiments may allow the scheduled sharing of different types of IP streams within the same pipeline.

Within any pipeline, the IP datagram demux block 202, 212 filters out desired IP streams and divides those into elementary streams. Each elementary stream is written to a separate output. One elementary stream can contain one or more IP streams. The IP streams for each elementary stream are delivered to the Multi-Protocol Encapsulation-Forward Error Correction (MPE-FEC) encoding block 203, 213, where they are written into an application data table. Each elementary stream may be written into its own table. Once the application data table is full (or if the delta-t period, explained more fully below, has passed) the encoding block acts. If MPE-FEC is enabled, the block calculates Reed Solomon (RS) parity bytes and inserts them into an RS data table. Both data tables together, forming one MPE-FEC frame, are forwarded to the next functional block. If MPE-FEC is not enabled, then the block does not perform RS calculations, and merely buffers the IP streams for time-slice forming.

The MPE/MPE-FEC section encapsulation block 204, 214 encapsulates the payload from the previous block into a section and forms a section header. The payload may include an IP datagram for a MPE section, and an RS column for a MPE-FEC section. All real-time parameters needed for each section, except for delta-t (explained below) and CRC-32, are here inserted. Section header values, including address, table_boundary, and frame_boundary are inserted into the MPE and MPE-FEC sections. Additionally, MPE-FEC-specific header values are inserted into the section, including padding_columns, last_section_number, and section_number. The sections are then forwarded to the time slicing block 205, 215, where delta-t is calculated and inserted into section headers. Time slicing block 205, 215 also calculates Cyclic Redundancy Check (CRC-32) values which are inserted into the sections as well.

Time slicing involves the transmission of content in high-bandwidth bursts rather than in lower-bandwidth constant streams. As such, receivers of transmissions should be able to determine when the next burst will be arriving, and hence delta-t is calculated to inform receivers when the following burst is to be expected. Thus, delta-t represents the amount of time to the next time slice burst within the elementary stream. In this fashion, low power receivers are able to receive content in bursts and power down their radios in-between transmissions. Differing content can be scheduled in interspersed intervals, allowing a receiver to turn on and off its radio only when content of interest is expected. A Tisle (Time slicing) frame represents a series of time-sliced bursts sent in sequence. A Tisle slot is the spot that one burst takes within a Tisle frame. Content transmitted within a particular slot of a first frame will be broadcast in the same slot in a subsequent second frame.

The Transport Stream (TS) generation & multiplexing block 207 fragments incoming time-sliced sections into the payload of TS packet(s) and generates a header for each TS packet. The Moving Pictures Experts Group Transport Stream (MPEG TS) standard may be used to form the TS packets. The functional block also integrates sections from real-time services and non-real-time services. Finally, the time sliced sections and program specific information and signaling information (PSI/SI) from the PSI/SI generation block 206 are multiplexed into one output TS having a fixed data rate.

Figure 3A:
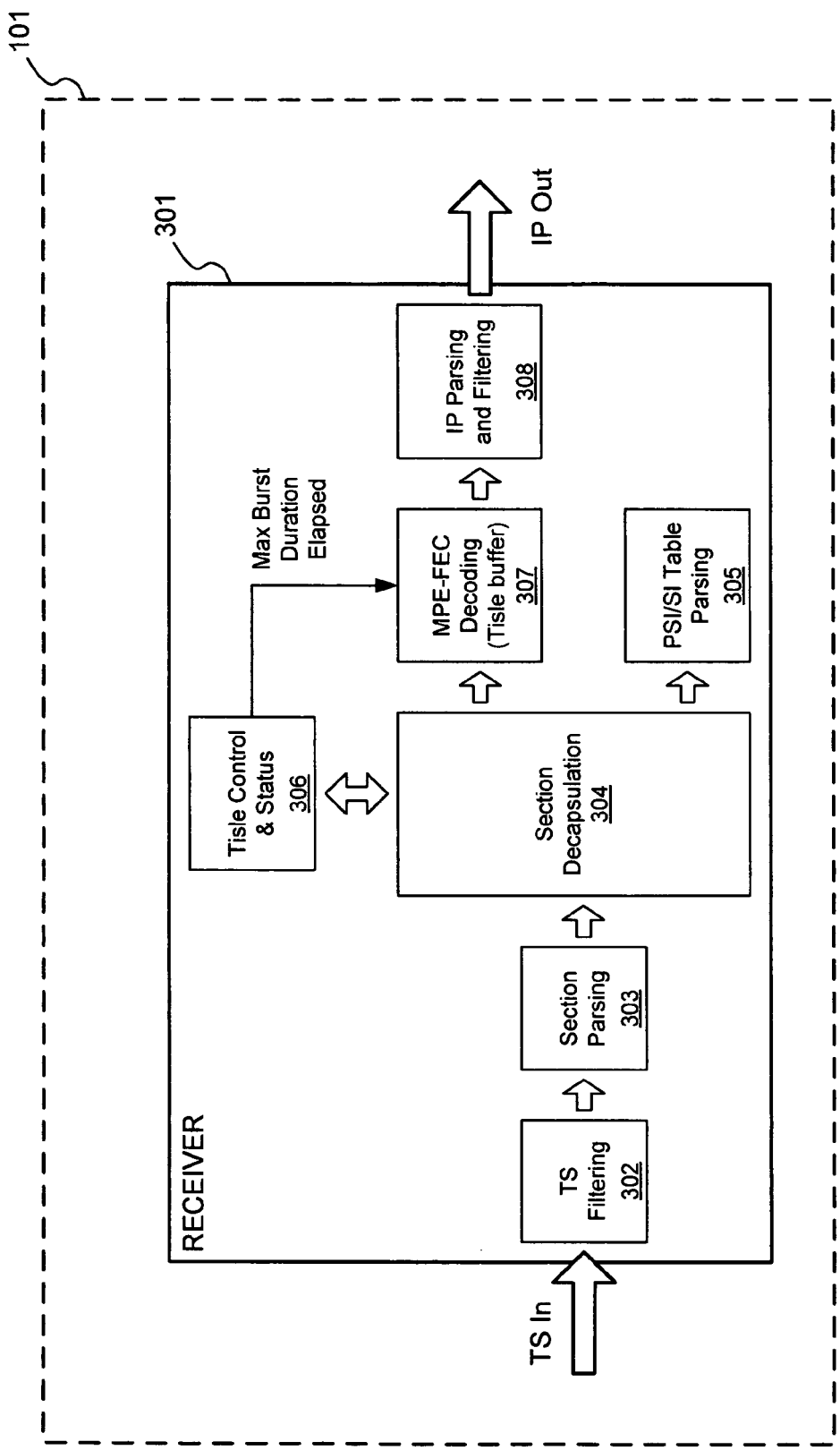
FIG. 3A illustrates a suitable mobile terminal in which one or more illustrative embodiments of the invention may be implemented.

FIG. 3 illustrates a suitable mobile terminal 101 in which one or more illustrative embodiments of the invention may be implemented. Although one particular design is provided, functional blocks provided here may be combined, rearranged, separated, or even skipped.

An incoming signal is received by mobile terminal 101 and passed to receiver 301 as a transport stream (TS). The TS filtering block 302 receives the incoming TS in its entirety and, according to program identifiers (PIDs) assigned to TS packets, passes on only those TS packets belonging to desired content or elementary stream(s). Section parsing 303 decapsulates the payload of the TS packets and re-forms sections. The section decapsulation block 304 extracts real-time parameters and the payloads of each section. Based on the type of section (MPE/MPE-FEC or PSI/SI), it sends the section payloads and some real-time parameters to either the MPE/MPE-FEC decoding 307 or PSI/SI table parsing 305 blocks. Real-time parameters may also be sent to the Tisle control and status block 306.

The Tisle control and status block 306 is responsible for switching off receiver 301 after a particular burst is fully received, and again switching the receiver back on before the next burst is about to be received. It also signals the MPE/MPE-FEC decoding block 307 when the time of maximum burst duration has elapsed. This signaling may be needed so that the decoding block knows to start decoding in the case where the tail end of a burst is lost. The maximum burst duration may be signaled in a Time Slice and FEC identifier descriptor that is used in one or more PSI/SI tables, for example in Network Information Table (NIT), IP/MAC Notification Table (INT) or Conditional Access Table (CAT).

MPE/MPE-FEC decoding block 307 writes section payloads into an MPE-FEC frame according to address information (as determined from the real-time parameters) and decodes the whole frame row by row. The decoder can be either an erasure or non-erasure decoder. Erasure info can be obtained from the section CRC-32 or, if the erroneous TS packets are passed forward, from the transport error indicator located in the header of the TS packet. If the MPE-FEC is not used, then this block works as a time-slicing buffer storing one burst at a time.

IP parsing and filtering block 308 receives a whole MPE-FEC frame (or time-sliced burst). The IP parsing and filtering block 308 then goes through the corrected data areas in the frame to detect IP datagrams that were originally erroneous but were corrected by the decoder and then only passes on IP datagrams having a desired IP address. PSI/SI table parsing 305 parses PSI/SI tables from among the sections and delivers signaling information to other portions of mobile terminal 101.

On an elementary stream where Time Slicing and/or MPE-FEC are used, each MPE section and MPE-FEC section can carry real time parameters. As discussed above, all real time parameters except for delta-t are inserted into the MPE and MPE-FEC sections at the MPE/MPE-FEC Section Encapsulation block 204. The delta-t parameter is calculated and inserted into section headers in the time slicing block 205, 215. Time slicing 205, 215 also calculates Cyclic Redundancy Check (CRC-32) values which are inserted into the sections as well.

For an MPE section and MPE-FEC section, the following real time parameters may be used:

TABLE 1

Time Slicing and MPE-FEC Real Time Parameters

| Syntax | Number of Bits | Identifier |
|---|---|---|
| Real_time_parameters ( ) { | | |
| delta_t | 12 | uimsbf |
| table_boundary | 1 | bslbf |
| frame_boundary | 1 | bslbf |
| address | 18 | uimsbf |

The delta-t parameter defines the time to the next Time Slice burst within the elementary stream when Time Slicing is used and may vary from section to section. This time information is in all MPE sections and MPE-FEC sections within a Time Slice burst. The table_boundary parameter is a 1-bit flag that indicates the last section of the Application data table. The frame_boundary parameter is a 1-bit flag that indicates that the current section is the last section within the current burst or within the MPE-FEC frame in an MPE-FEC section. The address parameter is an 18-bit file that specifies the byte position in the corresponding MPE-FEC Frame table for the first byte of the payload carried within the section.

Figure 3B:
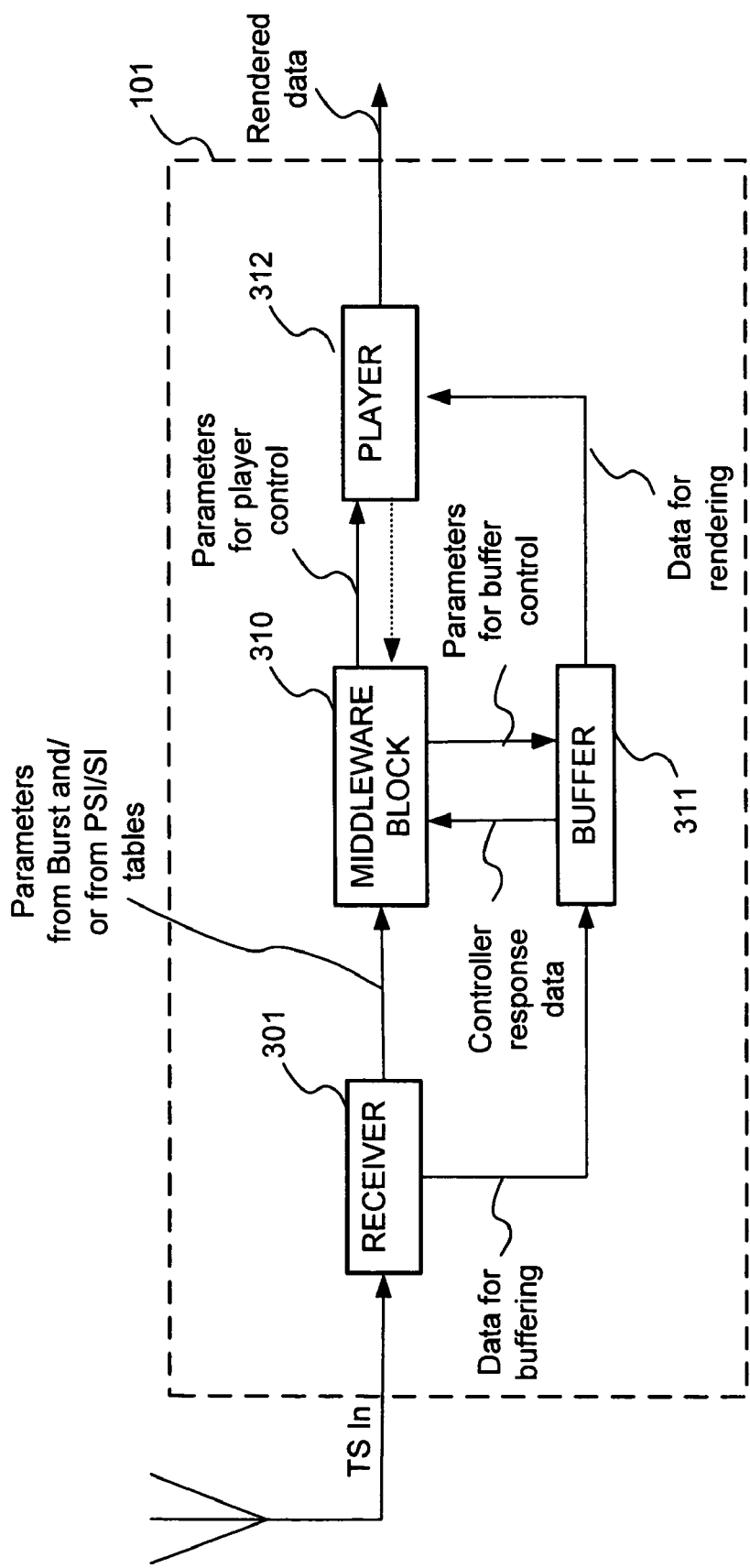
FIG. 3B is a block diagram illustrating a portion of a mobile terminal and receiver in which one or more illustrative embodiments of the invention may be implemented.

FIG. 3B illustrates an example of components of a mobile terminal in which one or more illustrative embodiments of the invention may be implemented. Although one particular design is provided, functional blocks provided here may be combined, rearranged, separated, or even skipped.

The mobile terminal 101 may include a receiver 301 as described, a buffer 311 for receiving data to be buffered from the receiver 301 and an interface block such as a middleware block 310 for receiving data associated with Time slice data received at the receiver. The middleware block 310 may comprise hardware, software or a combination of the two. The inventive principles of the middleware block 310 may further be embodied in a computer-readable medium. For example, in one example, the middleware block 310 may be a computer-readable medium containing computer-executable instructions for controlling data storage in a buffer or rendering of data by a player. The data received at the middleware block 310 from the receiver may include, for example, parameters from the data burst (e.g., delta t) or relating to it and/or data from PSI/SI tables. The middleware block 310 may, in addition to the parameters received from the receiver, also receive responses from a controller and/or from the player. Based on the parameters received, the middleware block 310 controls the buffering of data in the buffer 322 directly or via the controller. The mobile terminal 101 may further include a player 312. In one embodiment, the player is an executable software application. The player receives parameters from the middleware block 310 that controls or adjusts the rendering (e.g., presentation of multimedia data) by the player 312. The parameters received from the middleware block 310 at the player 312 can control the player 312 to render the data in such a way as to minimize or eliminate interruption of service. These parameters may include, for example, real time parameters or parameters from PSI/SI tables. One example of a real time parameter is a delta t parameter that is associated with the burst interval.

Thus, the receiver 301 provides data for buffering to the buffer 311 (stored based on the parameters from the receiver 301) and parameters from the burst and/or PSI/SI tables as described. The mobile terminal 101 may include an interface block such as the middleware block 310 illustrated in FIG. 3B. The middleware block 310 stores the currently used burst interval which is used for to control the buffering of data in the buffer 311. The burst interval may be based on a previously announced burst interval in the most recently received Session Description Protocol (SDP) file (see below) or may be specified by the delta t parameter from the receiver 301.

The Middleware block 310 may also receive other information that relates to the data bursts to control buffering. For example, the middleware block 310 may also receive parameters that are announced in descriptors in the PSI/SI tables. These may include, for example, parameters that describe the maximum burst duration, the maximum average rate or the frame size (e.g., MAXIMUM_BURST_DURATION, MAXIMUM_AVERAGE_RATE, and FRAME_SIZE, respectively).

The middleware block 310 may receive a parameter or a plurality of parameters from the receiver 301 (320) and forward the parameters to a controller for buffer control (321). The buffer 311 receives data for buffering (322) and buffers the data based on the parameters from the middleware block 310 (321). The data in the buffer 311 is provided to the player 312 (323). The player 312 may contain a player software application that renders the data. The middleware block 310 provides parameters to control the player 312 (324). The player 312 provides the rendered data based on the control parameters received from the middleware block 310.

Figure 4:
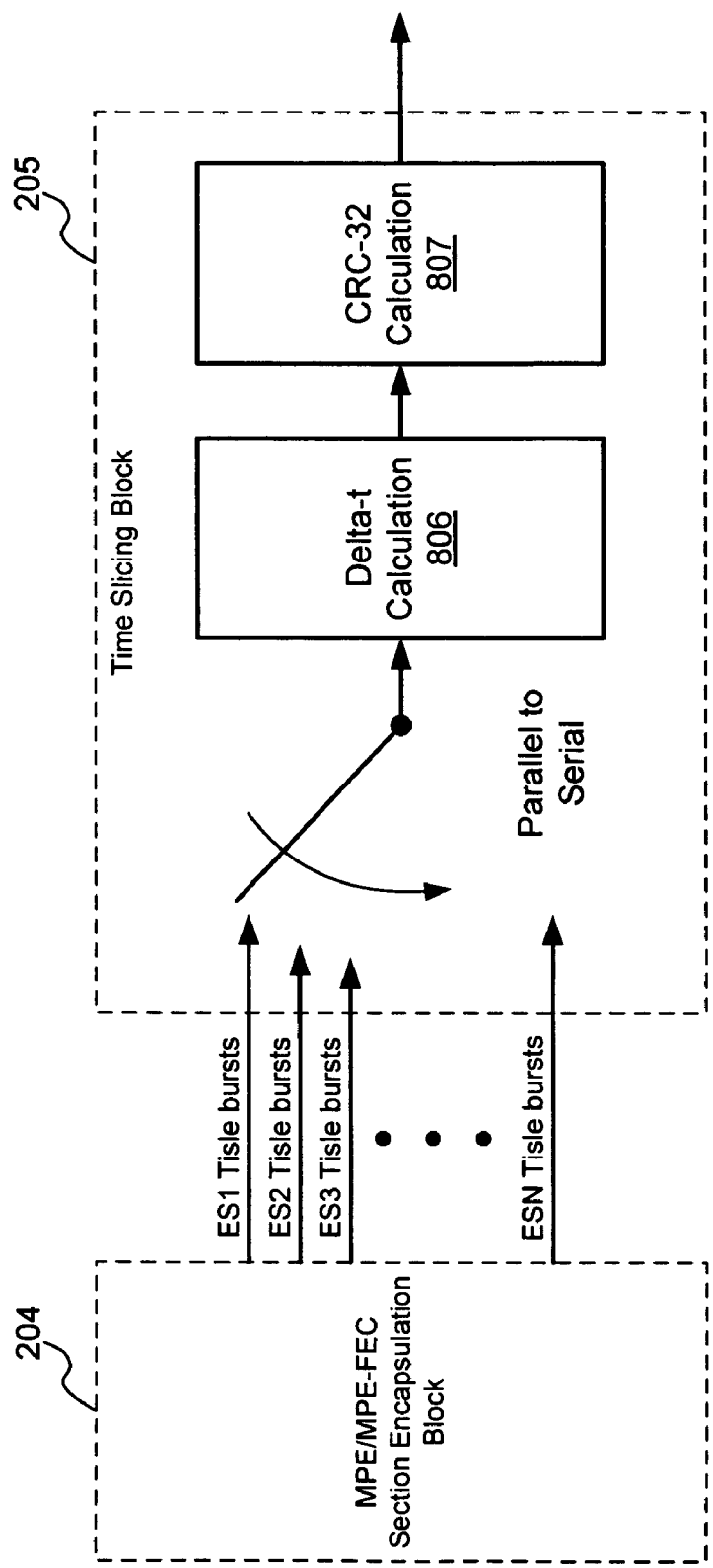
FIG. 4 illustrates a time slicing block in detail according to one or more illustrative embodiments of the invention.

Returning to digital broadcast transmitter 102, FIG. 4 illustrates a time slicing block 205 in greater detail according to one or more embodiments of the invention. The block reads parallel Time Slice bursts or MPE-FEC frames which consist of MPE and MPE-FEC sections, making the conversion from parallel to serial. Next, time slicing block 205 calculates and inserts delta-t values for the sections in the bursts and finally calculates and inserts the CRC-32 checksum. The output from this block is a serial stream of Time Slice bursts.

In order to play smoothly, data such as video and/or audio data needs to be available continuously and in the proper sequence without interruption. With streaming, data is copied or stored in a buffer and then, after a short delay, sometimes called PREROLL, starts playback and continues as the rest of the file is being pulled down. Streaming provides a steady method of delivery controlled by interaction between a receiver and a transmitter or server.

Figure 5:
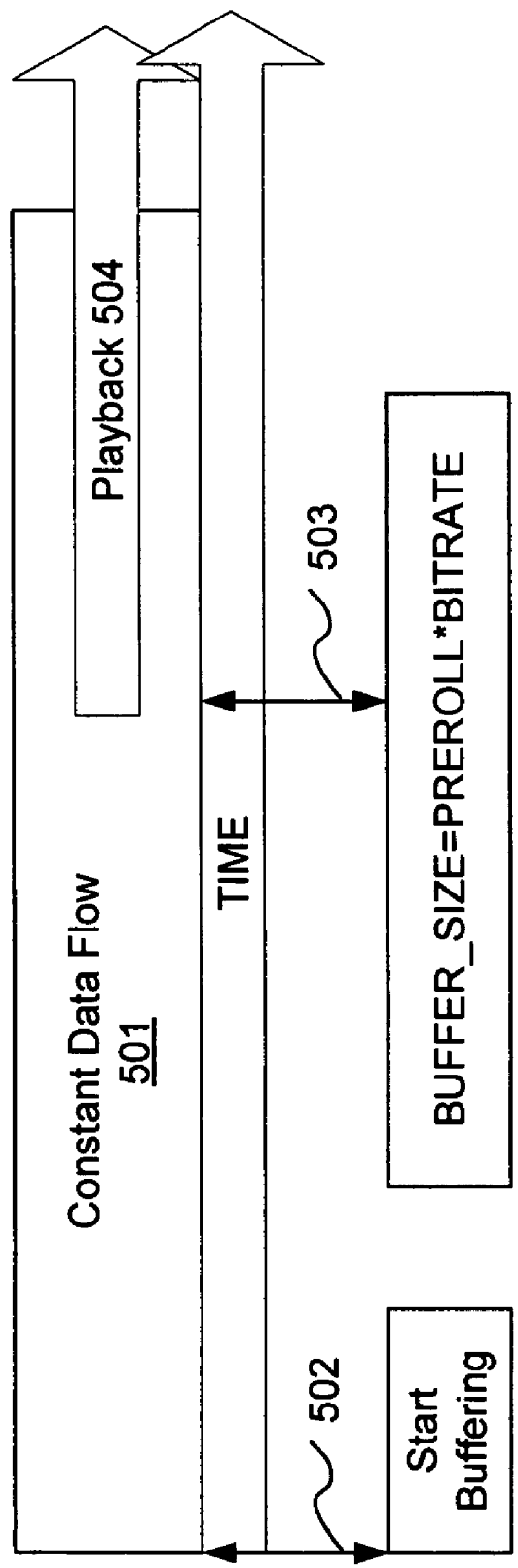
FIG. 5 is a timing diagram that illustrates buffering data streams for constant bit rate streams according to one or more illustrative embodiments of the invention.

When the duration of Time Slice slots and frames are fixed, the calculation of delta-t requires knowing the frame duration. Thus, the buffering of data can be determined based on the length of time to wait for storing incoming data streams in a buffer prior to consumption of the data and the bitrate of the service. Playback is started when enough data has been received in the buffer. For example, in networks where the duration of Time Slice slots and frames are fixed and the bit rate is nearly constant, a receiver may determine the amount of data needed to be buffered prior to consuming the data based on the following equation:

$$R=(PREROLL)*(BITRATE)$$

Where R=the required buffer size needed prior to data consumption. FIG. 5 is a timing diagram that illustrates buffering data for a system in which the data streams are provided at a constant bitrate. Data is received 501 and stored 502 in a buffer. Playback 504 begins when the amount of data stored in the buffer is equal to the buffer size needed prior to data consumption (e.g., playback 504). The required buffer size needed prior to data consumption is PREROLL*BITRATE. Thus, when the amount of data stored in the buffer is equal to PREROLL*BITRATE (503), playback 504 begins.

Figure 6:
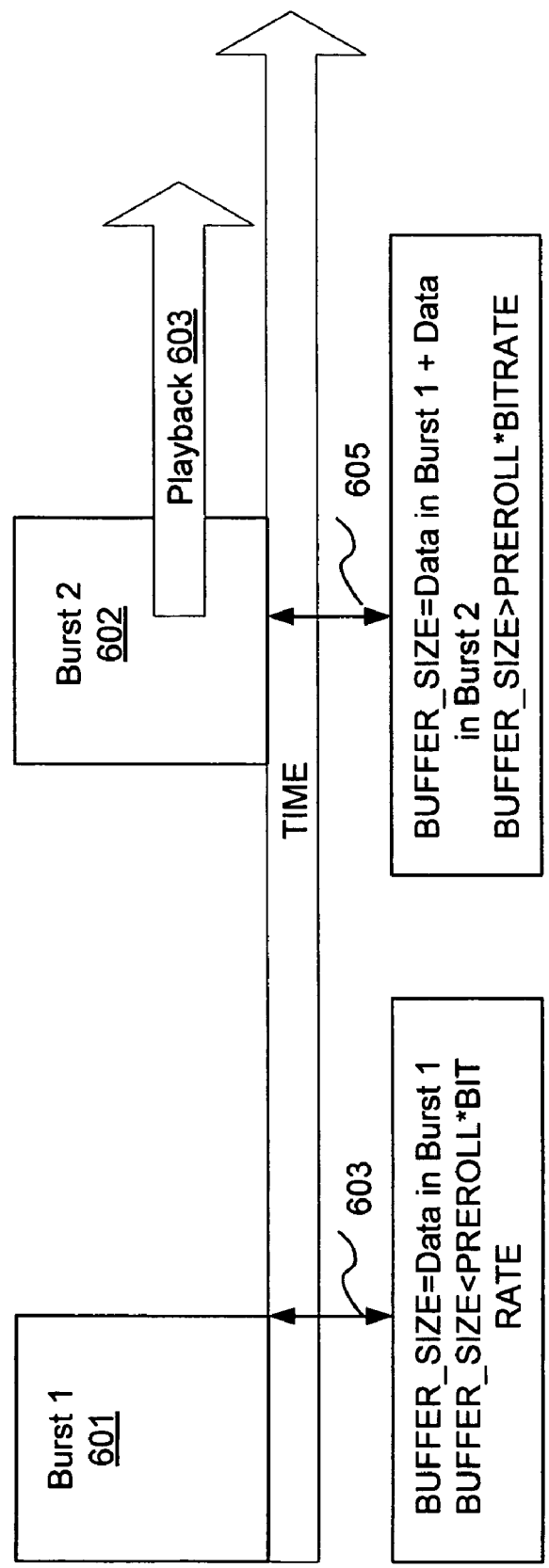
FIG. 6 is a timing diagram that illustrates an example of buffering in bursty traffic such as in a DVB-H network according to one or more illustrative embodiments of the invention.

However, when the duration of slots and frames vary such as in bursty traffic, the calculation of delta-t is more complicated. A DVB-H network is one example of a network with bursty traffic in which the bit rate is not constant. In such a situation, a terminal can wait until a subsequent burst to receive enough data in the buffer to begin playback. FIG. 6 is a timing diagram that illustrates buffering in a DVB-H network. A first Time Slice burst 601 of data is received and stored in a buffer. After storage of the data in the buffer (603), the buffer size becomes the amount of data in the first Time Slice burst 601. The required size of the buffer (amount of data stored in the buffer) needed prior to data consumption is calculated as (PREROLL)*(BITRATE). In this example, the amount of data received in the first Time Slice burst 601 is less than the calculated amount of data (PREROLL*BITRATE). Therefore, playback 603 does not begin at this time (603). Rather, the service waits for the receipt and storage into the buffer of the second Time Slice burst 602. If the buffer size equals the calculated amount of data needed prior to data consumption during the receipt and storage of data from the second Time Slice burst 602 into the buffer, playback 603 may begin. In this example, the combined amount of data from the first Time Slice burst 601 and the second Time Slice burst 602 exceeds the calculated required size of the buffer needed prior to data consumption (i.e., PREROLL*BITRATE). Therefore, playback begins once the size of the buffer (amount of data stored in the buffer) reaches the calculated required amount (605).

Thus, during data streaming, the receiver monitors the amount of data stored in the buffer. Playback is started only when the amount of data stored in the buffers reaches the required amount which is typically PREROLL*BITRATE. PREROLL can be calculated taking into account any transmission delay of the network and/or delays in encoder buffering. When the BITRATE is not constant, for example in bursty traffic such as in DVB-H networks, the PREROLL should be set large enough so that the data in the buffer does not become exhausted. The PREROLL can be calculated in bursty networks, for example, by the further addition of the burst interval to the other delays of the network such as transmission network delay, transmission delay jitter buffering, de-interleaving buffering and pre-decoder buffering.

Figure 7:
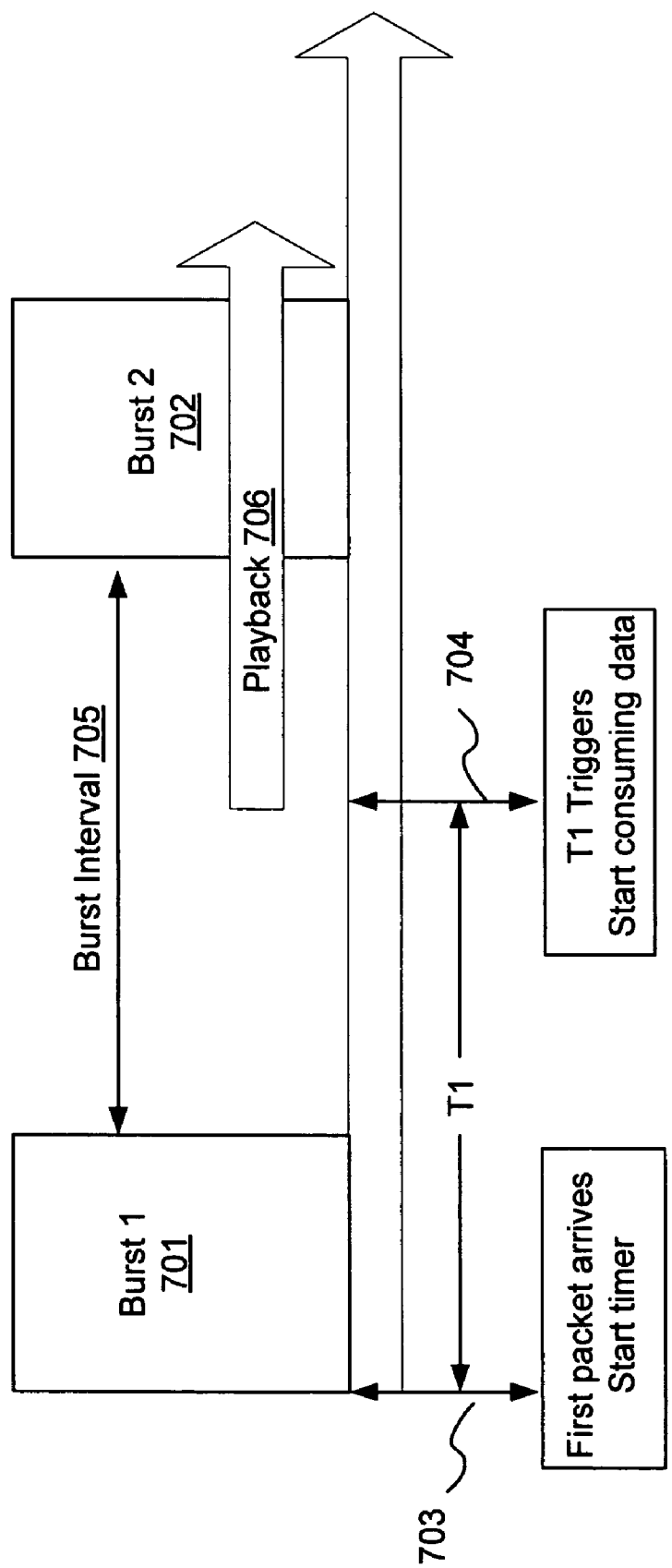
FIG. 7 is a timing diagram that illustrates another example of buffering in bursty traffic such as in a DVB-H network according to one or more illustrative embodiments of the invention.

FIG. 7 is a timing diagram illustrating buffering in bursty traffic such as in a DVB-H network. In FIG. 7, data is received in Time Slice bursts 701, 702, each burst separated by a known burst interval 705. Timing begins 703 at the start of receipt of a first Time Slice burst 701. If the amount of data in the buffer is insufficient to begin playback 706 after the first Time Slice burst 701 is copied to the buffer, the receiver terminal waits a time T1 (measured from the point time begins 703) before playback begins. However, the burst interval 705 is known such that it is also known that data in a second Time Slice burst 702 will be received into the buffer at a particular time (following the burst interval 705). Therefore, playback 706 may be started at an optimal time 704 even before the buffer contains the full amount of data required prior to data consumption. This results in faster playback startup while maintaining low power consumption.

The optimal time 704 for starting playback 706 (i.e., consumption of data in the buffer) can be determined based on several factors including delays in buffering and other delays such as transmission delay jitter buffering, de-interleaving buffering and pre-decoder buffering. These delays can be represented in a parameter such as "BUFFERING_DELAY". The optimal time 704 can further be determined based on average size of a Time slice burst (represented in this example as the parameter "AVERAGE_BURST_DATA_SIZE"), the amount of data in the buffer (represented in this example as the parameter "AMOUNT_OF_DATA_IN_BUFFER"), and the burst interval (represented in this example as the parameter "BURST INTERVAL"). The AVERAGE_BURST_DATA_SIZE may be determined based on the average bitrate of the data stream (represented in this example as the parameter "AVERAGE_BITRATE"). Hence the optimal time 704 for starting playback 706 may be determined based on the following general equation:

$$T1=BD+((ABDS-ADB)/ABDS)*BURST\_INTERVAL$$

Where T1 is the optimal time for waiting to begin playback after a first data packet is received, BD is the BUFFERING_DELAY, ABDS is the AVERAGE_BURST DATA_SIZE, and ADB is the AMOUNT_OF_DATA_IN_BUFFER. The AVERAGE_BURST_DATA_SIZE may further be calculated as AVERAGE_BITRATE*BURST_INTERVAL.

In determining the optimal time T1 to wait, the timer begins when a first data packet is received. Time continues to be updated as the buffer size changes in response to further receipt of data packets. As can be seen, if there is no delay in receiving the first Time Slice burst, then AVERAGE_BURST_DATA_SIZE is equal to AMOUNT_OF_DATA_IN_BUFFER. In that case, T1 is equal to BUFFERING DELAY. This is the best case scenario. However, if a Time Slice burst is just missed, then time does not begin until the receipt of the next first data packet. This amount of time is the BUFFERING_DELAY. After the first data packet is received, the timer begins for a further wait of a length of time equal to the BURST_INTERVAL. Hence, if the Time Slice burst is just missed, the total wait time to begin playback is BUFFERING_DELAY+BURST INTERVAL. This is the worst case scenario.

In most cases, the length of time for waiting to begin playback will be between the best case and worst case scenarios. The length of time for waiting to begin playback is the length of time until the next Time Slice burst plus BUFFERING_DELAY. Thus, the time varies based on the length of time to wait for the next burst which can vary as described.

In another example, a partial burst is received. In this case, AMOUNT_OF_DATA_IN_BUFFER is likely less than the AVERAGE_BURST_DATA_SIZE (which is equal to the AVERAGE_BITRATE*BURST_INTERVAL). This is because a partial burst of data does not provide the full amount of data of an average burst. For example, if the buffering delay is 200 ms, the burst interval 3000 ms (3 seconds), bitrate is 240 kbps and there is partial buffering of 500 kbits, then T1, the optimal length of time for waiting prior to beginning playback is as follows:

$$T1=BD+((ABDS-ADB)/ABDS)*\text{BURST\_INTERVAL}$$

$$T1=200\text{ ms}+((((240\text{ kbps}*3\text{ sec}))-500\text{ kb})/(240\text{ kbps}*3\text{ sec}))*3000\text{ msec}$$

$$T1=200\text{ ms}+((720\text{ kb}-500\text{ kb})/720\text{ kb})*3000\text{ msec}$$

$$T1=200\text{ ms}+(220\text{ kb}/720\text{ kb})*3000\text{ msec}$$

$$T1=200\text{ ms}+916.67\text{ msec}=1116.67\text{ msec}$$

Therefore, in this example, the player can start playback 1167.67 msec after the partial burst of 500 kbits is received.

The buffering time can be determined based on the values of the burst interval, the buffering delay and the average bitrate in the form of parameters as described. These parameters may be provided by the server sending the data stream by inclusion of the parameters in a Session Description Protocol (SDP) file. In this example, a text-based message format for describing a multimedia session includes the parameters. An example of the formatting of SDP file parameters is provided in the following table.

TABLE 2

SDP File

| SDP File | Description/explanation |
| --- | --- |
| v=0 | Version |
| 0=−4119900237 1080299011 IN IP4 192.168.44.30 | Origin: source IP address |
| s=Broadcaster_Live | Subject |
| C=IN IP4 224.177.0.1/16 | Connection: target IP address |
| t=0 0 | Timestamps: start, end |
| m=video 4060 RTP/AVP 99 | First media: video, port number (4060), RTP payload type (99) |
| b=AS:65 | Bitrate |
| a=rtpmap:99 H263-2000/90000 | Codec of RTP payload type |
| a=fmtp:99 profile=0; level 20 | Parameters of RTP payload type |
| a=framesize:99 176-144 | Framesize of RTP payload type |
| a=control:trackID=11 | |
| a=mpeg4-esid:11 | |
| m=audio 4062 RTP/AVP 110 | Second Media: audio, port number, RTP payload type |
| b=AS:88 | Bitrate |
| a=rtpmap:110 MP4A-LATM/44100/2 | Codec of RTP payload type |
| a=control:trackID=12 | |
| a=mpeg4-esid:12 | |
| a=fmtp:110 profile-level-id=15; object=23; cpresent=0; config=420024203FC0 | Parameters of RTP payload type |

As demonstrated in Table 2, the parameters for determining the buffering time may, for example, be included in an SDP file with a general format of attributes a=<attribute>: <value> or similar accepted format for SDP parameters.

Figure 8:
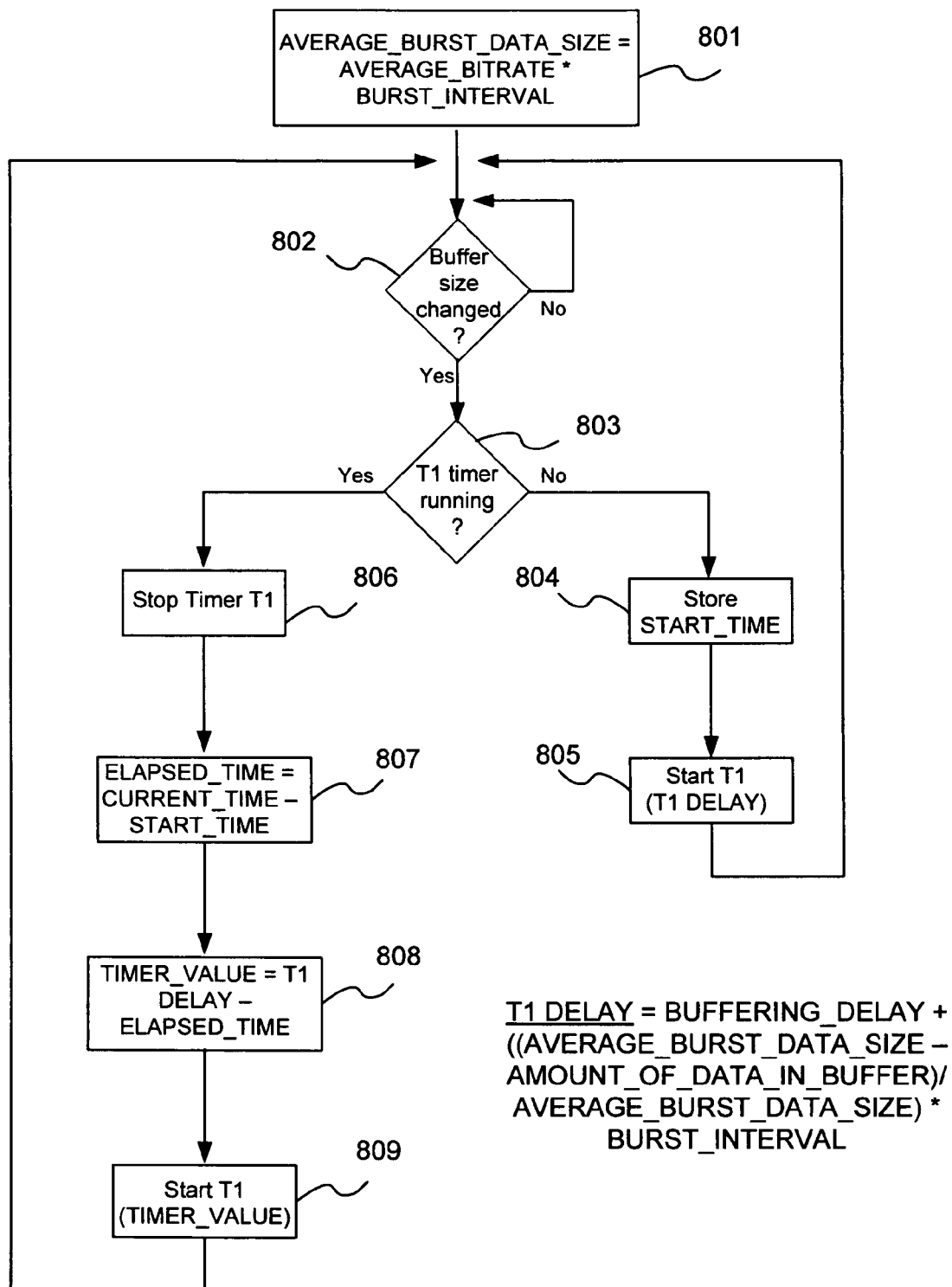
FIG. 8 is a flowchart illustrating a method of calculating an optimal buffering time according to one or more illustrative embodiments of the invention.

FIG. 8 is a flowchart that illustrates one example of using the values for the burst interval, buffering delay and average bitrate to determine the optimal buffering time T1. The burst interval, buffering delay and average bitrate are provided by the server in this example as corresponding parameters BURST_INTERVAL, BUFFERING_DELAY and AVERAGE_BITRATE. The average burst data size is represented by the parameter "AVERAGE_BURST_DATA_SIZE" and is equal to the AVERAGE_BITRATE*BURST_INTERVAL (Step 801). In step 802, the buffer size is examined to determine if the size of the buffer has changed. Changes in the buffer size may occur, for example, upon receipt and storage of incoming data in the buffer (i.e., when data is stored in the buffer, the buffer size increases). If the buffer size has not changed (the "no" branch of step 802), the process does not perform any action and waits for the receipt of data streams. If it is determined that the buffer size has changed (e.g., data has been stored in the buffer) in step 802 (the "Yes" branch of step 802), it is then determined if the T1 timer is running in step 803. If the T1 timer is not running (the "no" branch of step 803), in step 804 the first data packet is received and stored in the buffer. Hence, the timer has not previously started and the start time (represented in this example by the parameter "START_TIME") is stored as a reference point from which waiting begins in step 805 before playback (706, FIG. 7) begins. The wait time is set to a T1 delay which, in this example, is BUFFERING DELAY+((ABDS−ADB)/ABDS) *BURST_INTERVAL, where ABDS is "AVERAGE_ BURST_DATA_SIZE" and ADB is "AMOUNT_OF_ DATA_IN_BUFFER".

If the buffer size has changed (the "yes" branch of step 802) and the T1 timer is running (the "yes" branch of step 803), then another Time Slice burst has been received and stored in the buffer prior to the expiration of the previously calculated T1 delay. In this case, the timer is stopped (step 806) and the elapsed time (represented in this example as the parameter "ELAPSED_TIME") is determined (step 807). ELAPSED_ TIME is calculated as CURRENT_TIME_START_TIME, where CURRENT_TIME is a parameter representing the current time (i.e., the elapsed time is the amount of time that has passed between the time the timer started to the present time). The timer value (represented in this example by the parameter "TIMER_VALUE") is determined (step 808) as the T1 delay previously calculated minus the elapsed time. Because in this scenario the T1 delay exceeds the time that has already elapsed, the calculated timer value indicates the amount of time to further wait beyond the currently elapsed time to wait the required T1 delay time. The timer T1 is turned on again for the amount of time represented by TIMER_ VALUE in step 809 (i.e., the amount of time left to wait before playback begins). The process continues until the total required amount of time elapses and playback begins.

In another example of determining the optimal buffering time, incoming traffic contains timestamp information such as in Real-time Transport Protocol (RTP). In such a situation, the timestamp information may be used to determine the optimal buffering delay. For example, the timestamp information may include the earliest timestamp and the latest timestamp, which may be represented as corresponding parameters FIRST_RTP_TS and LAST_RTP_TS. Through use of these parameters, the optimal time for waiting prior to playback of data (T1) may be determined as follows:

$$T1=(\text{BUFFERING\_DELAY}+\text{BURST\_INTERVAL})-(\text{LAST\_}RTP\_TS\_\text{FIRST\_RTP\_}TS)$$

Figure 9:
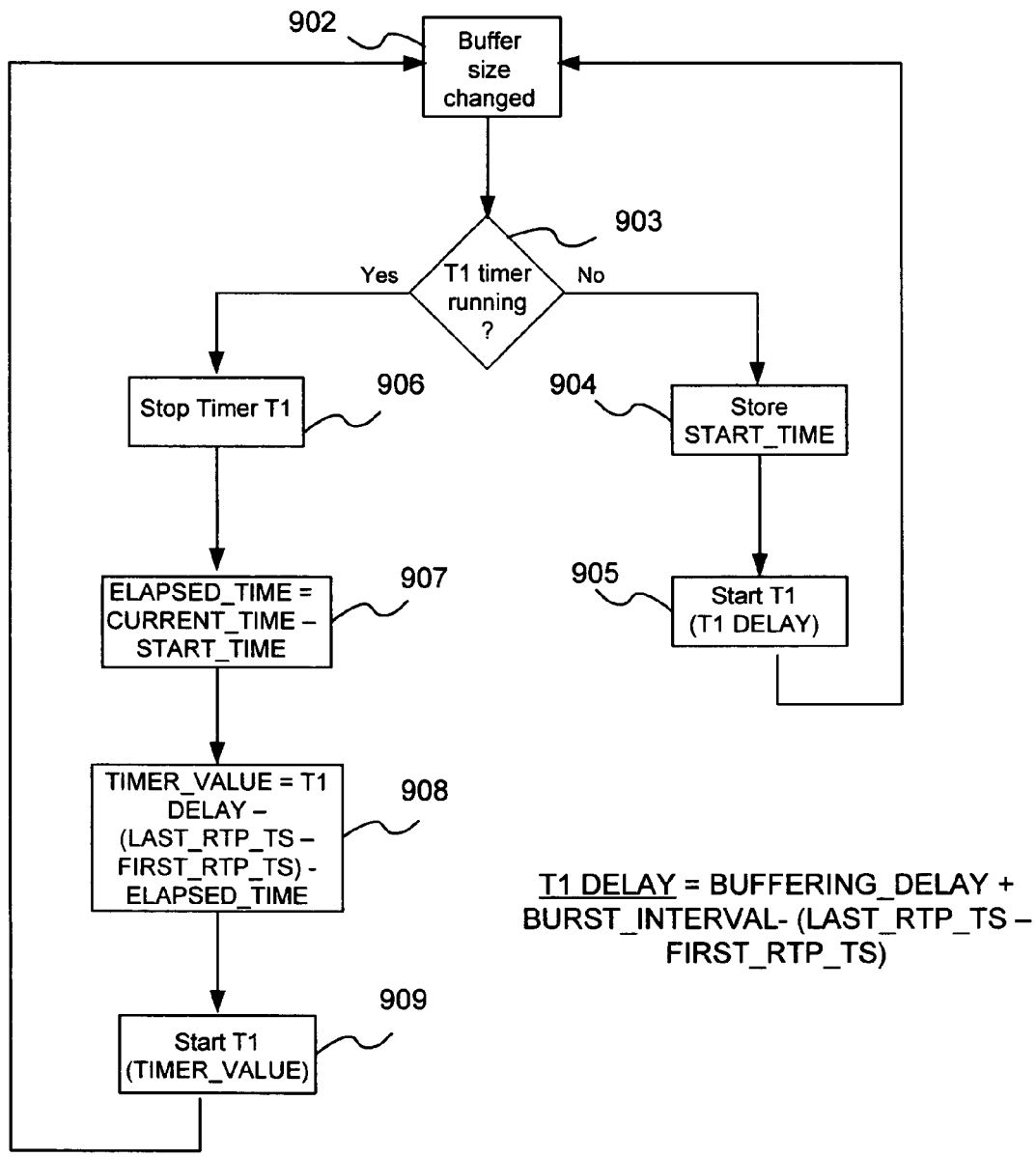
FIG. 9 is a flowchart illustrating another method of calculating an optimal buffering time according to one or more illustrative embodiments of the invention.

FIG. 9 is a flowchart that illustrates one example of using the latest and earliest timestamp information (represented in this example by LAST_RTP_TS and FIRST_RTP_TS parameters, respectively) provided from the server to determine the optimal buffering time T1. As in the previous example, in step 902, a change of buffer size is detected (e.g., data may have been stored in the buffer). In step 903, it is then determined if the T1 timer is running and if it is not running (the "no" branch of step 903), the first data packet in step 904 is received and stored in the buffer and the start time (e.g., "START_TIME") is stored as a reference point from which waiting begins in step 905 before playback (706, FIG. 7)

begins. The optimal buffering time is set to a T1 delay which, in this example, is BUFFERING DELAY+BURST_INTERVAL−(LAST_RTP_TS−FIRST_RTP_TS).

If the T1 timer is running (the "yes" branch of step 903), as in the previous example, the timer is stopped (step 906) and the elapsed time (e.g., "ELAPSED_TIME") is determined (step 907) as CURRENT_TIME−START_TIME. The timer value (e.g., "TIMER_VALUE") is determined (step 908) as the T1 delay previously calculated (i.e., BUFFERING_DELAY+BURST_INTERVAL−(LAST_RTP_TS−FIRST RTP_TS) minus the elapsed time. The calculated timer value indicates the amount of time to further wait beyond the currently elapsed time. The timer T1 is turned on again for the amount of time represented by TIMER_VALUE in step 909. The process continues until the total required amount of time elapses and playback begins.

In another example, the burst interval of a received data stream is changed. The burst interval may change based on a variety of reasons. For example, parameters in the time slicing block 205 may change causing a change in the burst interval. Also, handover to a DVB-H cell with different burst interval settings may cause a change in the burst interval. If the burst interval decreases, the player 312 can continue playing the data stream uninterrupted. However, if the burst interval increases to a larger value than what it was when the player 312 originally buffered or when the player 312 was last rebuffered, then rebuffering may be required. The change in burst interval may be indicated by the real-time parameter delta-t of a DVB-H signal or from an updated Electronic Service Guide (ESG).

If the altered burst interval is shorter than the previous burst interval, there is more data in the buffer than needed for playback or rendering. However, if the altered burst interval is greater than the previous burst interval, then the buffer may become depleted of data and buffering has to start from the beginning. For example, the buffering time may be the burst interval plus the buffering delay (e.g., BURST_INTERVAL+BUFFERING_DELAY).

Figure 10:
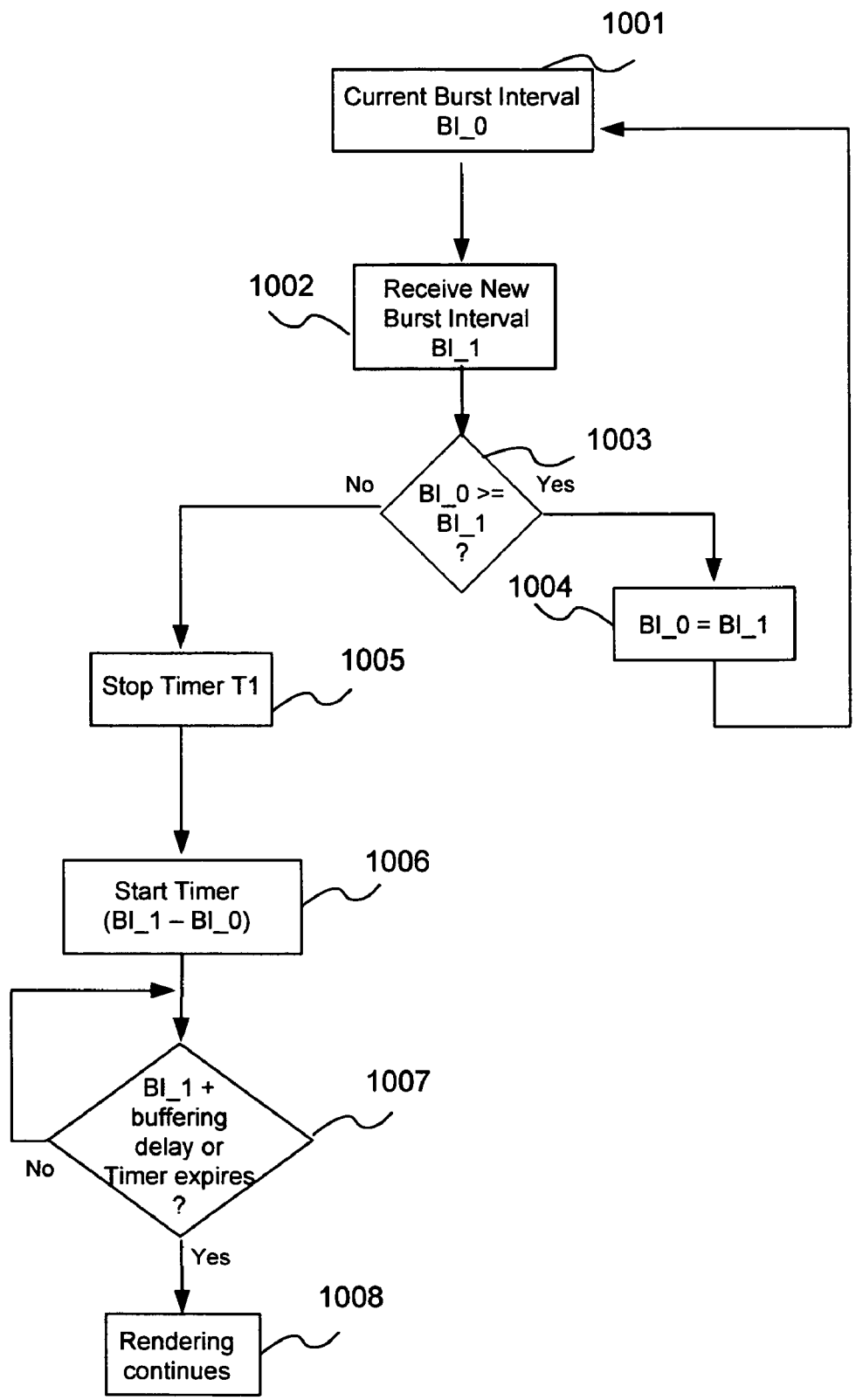
FIG. 10 is a flowchart illustrating an example of rendering of data from a mobile terminal with changing of the burst interval according to one or more illustrative embodiments of the invention.

FIG. 10 is a flowchart that illustrates one example of changing of the burst interval. In this example, an interface block such as the middleware block 310 of FIG. 3B in a mobile terminal 101 receives a delta t parameter or parameters from PSI/SI tables from a receiver block 301 and compares the received parameter(s) to a previous burst interval. For example, a player is consuming data during times based on a burst interval of received bursts of data (step 1001). A delta t parameter may be received in step 1002 from the receiver block 301 and compared to the previous burst interval in step 1003. The previous burst interval may be, for example, an original burst interval previously announced or may be a subsequent updated burst interval (e.g., received in an SDP file). If the previous burst interval (BI_0) is greater than or equal to the currently received burst interval (BI_1) ("yes" branch of step 1003), then data can continue to be buffered as before (step 1004) because the currently received burst interval (BI_1) is encompassed by the previous burst interval (BI_0). In this case, rendering (i.e., presentation of multimedia data) continues.

If the previous burst interval (BI_0) is less than the currently received burst interval (BI_1) ("no" branch of 1003), then data in the buffer might be depleted. In this case, the player 312 is paused (step 1005) and a timer may be set in step 1006 to the difference between the newly received burst interval and the previous burst interval (BI_1−BI_0). Thus, rendering (e.g., presentation of multimedia data) is paused while data continues to be stored in the buffer 311. When the timer expires or when the buffer contains data during BI_1+Buffering_delay (step 1007), rendering of the data continues in step 1008.

The present invention thus provides a method and system for providing optimized buffering times for playback startup and/or channel switching. The buffering time is reduced permitting longer burst intervals and lower power consumption. Memory consumption is also reduced.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

What is claimed is:

1. A method comprising:
   detecting a change in an amount of received data stored in a buffer;
   receiving a first value indicating an average data size of a data burst;
   receiving a second value indicating a buffering delay, a third value indicating the amount of received data in the buffer, and a fourth value indicating a burst interval of data bursts; and
   determining a buffering time based on the first value, the second value, the third value, and the fourth value by setting the buffering time equal to the second value+(((the first value−the third value)/first value)*the fourth value); and
   consuming the received data only after the buffering time has elapsed.

2. The method of claim 1 further comprising:
   determining an elapsed time, the elapsed time being the difference between a current time and a time the change in the amount of received data stored in the buffer was detected, wherein determining the buffering time comprises setting the buffering time equal to the second value+(((first value−third value)/first value)*the fourth value)−the elapsed time.

3. The method of claim 1 further comprising:
   receiving a fifth value indicating a second buffering time; and
   continuing consuming the data if the buffering time is greater than the second buffering time, otherwise:
      determining a period of time for suspending consuming the data;
      suspending consuming the data for the period of time; and
      resuming the consuming the data after the period of time elapses.

4. The method of claim 3 wherein the period of time for suspending consuming the data is equal to the second buffering time minus the buffering time.

5. The method of claim 3 wherein the period of time for suspending consuming the data is equal to the second buffering time and a buffering delay.

6. A method comprising:
   detecting a change in an amount of received data stored in a buffer;
   receiving a first value indicating an earliest timestamp corresponding to the received data stored in the buffer, wherein the received data includes corresponding timestamp information including the earliest timestamp and a latest timestamp;

receiving a second value indicating a buffering delay and a third value indicating the burst interval and a fourth value indicating the latest timestamp;

determining a buffering time by setting the buffering time equal to the second value+third value−(the fourth value−the first value); and consuming the received data only after the buffering time has elapsed.

7. The method of claim 6 further comprising:

determining an elapsed time, the elapsed time being the difference between a current time and a time in which the change in the amount of received data stored in the buffer was detected; and wherein determining the buffering time includes setting the buffering time equal to the second value+the third value−(the fourth value−the first value)−the elapsed time.

8. An apparatus comprising:

an interface configured to receive one or more inputs for indicating a plurality of parameters, at least one of the parameters indicating the amount of data in a buffer;

a timer; and one or more processors, configured to perform:

storing a start time value if the timer is off, otherwise turning the timer off;

calculating a buffering time based on the plurality of parameters by setting the buffering time equal to the buffering delay+((the average amount of data in a data burst−the amount of data in the buffer)/the average amount of data in a data burst)*the burst interval;

turning on the timer; and receiving data from the buffer only after the buffering time has elapsed.

9. The apparatus of claim 8, wherein the one or more processors are further configured to perform before the receiving data from the buffer:

turning the timer off after at least a portion of a subsequent burst of data is stored in the buffer; and calculating a timer value, the timer value being the amount of time for waiting before receiving data from the buffer, wherein calculating the buffering time includes setting the buffering time equal to the amount of time indicated by the timer value, and wherein the timer value is equal to (the buffering delay+((the average amount of data in a data burst−the amount of data in the buffer)/the average amount of data in a data burst)*the burst interval)−an elapsed time, the elapsed time being equal to a current time minus the stored start time.

10. An apparatus comprising:

an interface configured to receive one or more inputs for indicating a first parameter indicating an earliest timestamp and a second parameter indicating a latest timestamp;

a timer;

one or more processors, configured to perform:

storing a start time value if the timer is off, otherwise turning the timer off;

calculating a buffering time based on the first parameter and the second parameter by setting the buffering time equal to a buffering delay+burst interval−(the second parameter−the first parameter);

turning on the timer; and receiving data from the buffer only after the buffering time has elapsed.

11. The apparatus of claim 10 wherein the one or more processors are further configured to turn the timer off after at least a portion of a subsequent burst of data is stored in the buffer, wherein calculating the buffering time includes setting the buffering time equal to the buffering delay+burst interval−(the second parameter−the first parameter)−an elapsed time, the elapsed time being equal to a current time minus the stored start time.

12. A computer-readable storage medium encoded with instructions that, when executed by a computer, perform:

detecting a change in an amount of received data stored in a buffer;

receiving a first value indicating one of an average data size of a data burst;

receiving a second value indicating a buffering delay, a third value indicating the amount of received data in the buffer, and a fourth value indicating a burst interval of data bursts; and determining a buffering time based on the first value, the second value, the third value, and the fourth value by setting the buffering time equal to the second value+(((the first value−the third value)/first value)*the fourth value); and consuming the received data only after the buffering time has elapsed.

* * * * *